US006366387B1

(12) United States Patent
Wilson

(10) Patent No.: US 6,366,387 B1
(45) Date of Patent: Apr. 2, 2002

(54) DEPIXELIZER

(76) Inventor: Stephen S. Wilson, 35120 El Niguel Rd., Lake Elsinore, CA (US) 92530

( * ) Notice: Subject to any disclaimer, the term of this patent is extended or adjusted under 35 U.S.C. 154(b) by 0 days.

(21) Appl. No.: 09/569,148

(22) Filed: May 11, 2000

(51) Int. Cl.[7] .................. G02B 26/00; G02B 26/08; H04N 3/08
(52) U.S. Cl. .............. 359/237; 359/223; 359/224; 348/203; 73/504.02
(58) Field of Search ................ 359/237, 238, 359/223, 224, 298, 230, 214; 348/203, 205; 73/504.02, 504.12

(56) References Cited

U.S. PATENT DOCUMENTS

| | | | |
|---|---|---|---|
| 5,864,326 A | 1/1999 | Rallison | 345/7 |
| 5,864,417 A * | 1/1999 | Ho | 359/201 |
| 5,897,980 A | 4/1999 | Phillips et al. | 430/6 |
| 5,905,328 A | 5/1999 | Wilkinson | 313/309 |
| 5,926,319 A | 7/1999 | Phillips et al. | 359/620 |
| 5,945,967 A | 8/1999 | Rallison et al. | 345/42 |
| 6,118,569 A * | 9/2000 | Plesko | 359/202 |

* cited by examiner

*Primary Examiner*—Georgia Epps
*Assistant Examiner*—Tim Thompson
(74) *Attorney, Agent, or Firm*—Stetina Brunda Garred & Brucker

(57) ABSTRACT

A depixelizer for enhancing an image generated by a spatial light modulator having an array of pixels. The depixelizer comprising a translatable stage having the spatial light modulator attached thereto. The stage being moveable in a first axis of motion and a second axis of motion. The movement of the stage in at least one axis oscillates the spatial light modulator and enhances the image generated thereby.

22 Claims, 3 Drawing Sheets

DEPIXELIZER

CROSS-REFERENCE TO RELATED APPLICATIONS (Not Applicable)

STATEMENT RE: FEDERALLY SPONSORED RESEARCH/DEVELOPMENT (Not Applicable)

BACKGROUND OF THE INVENTION

The present invention generally relates to a system and method of eliminating the appearance of pixels on an image, and more particularly to a mechanical method of removing such pixel images.

Currently, spatial light modulators (SLM's) are used to create digital image displays. The most common type of a SLM is the liquid crystal display (LCD) used in laptop computers and projectors. The LCD consists of an array of pixels (i.e., picture elements) that individually modulate a quantity of light impinging thereon. The individual pixels modulate the light from off to on or some level therebetween. The LCD may utilize polarization rotation to modulate the light level at each pixel. Alternatively, another class of spatial light modulators use a Schlieren system whereby incident light is deflected on or off an aperture to thereby modulate the light level. The SLM may be used in a projector to generate large images on a screen. In this respect, light is directed through the SLM to form the image on the screen.

The sharpness of an image is determined by the contrast ratio produced between two adjoining pixels. The contrast ratio is not dependent upon the resolution of the image, or whether discrete pixels or the grain in film creates the image. Generally, the contrast ratio for video is 200:1, while the contrast ratio for cinema is greater than 600:1. In order to maintain the contrast ratio for a SLM, any optics downstream of the SLM must have a transfer function two times greater than the limiting resolution of the modulator (i.e., Nyquist limit).

In a spatial light modulator, the array of pixels are generally arranged in rows and columns. Accordingly, each pixel is spatially isolated from an adjoining pixel by a black border. The active area of the pixel, as compared to the area of the pixel pitch, is known as the aperture ratio. The aperture ratio typically ranges from 92% to 45%. As will be recognized, the area around the pixel has no picture information in it and is optically opaque. Accordingly, the borders around the pixels create an array of black lines and columns superimposed around the pixels. This effect is commonly referred to as the screen door effect, as the image is similar to looking through a screen door.

Another deficiency with the current SLM's is the visual effect known as aliasing. Because the pixels are generally square and arranged in columns and rows, a line drawn on the display will appear as a stair-step if drawn at any angle other than horizontal or vertical. The worst case occurs when the pixels are square and the line is drawn at 45°. The line will appear as isolated squares joined at their corners. Accordingly, aliasing is the effect of a non-horizontal or non-vertical line appearing as a stair-step when produced by the spatial light modulator.

In rear projection video displays it is common practice for the screen to comprise an array of lenticular lenses separated by black strips. The black strips absorb light transmitted from the observers side of the screen and make the screen look blacker than it would otherwise be. By making the screen look blacker, the effective contrast ratio of the produced image is increased. However, if the spatial light modulator and the screen array are close in spatial frequency, a Moiré pattern will occur at a very low frequency. The Moiré pattern is a series of interference fringes which degrade the image on the screen.

The present invention addresses the above-mentioned deficiencies in prior art display systems by providing a system which removes undesired artifacts. Accordingly, the present invention reduces or illuminates the occurrence of the screen door effect through mechanical means. Additionally, the present invention eliminates Moiré patterns by shifting the temporal frequency of the projected image above the threshold that the human eye detects. Further, the present invention reduces the effects of aliasing by mechanically overlapping the corners of the adjacent pixels. As such, the present invention provides a projection system whereby the created image appears smoother without reducing the contrast ratio thereof.

BRIEF SUMMARY OF THE INVENTION

A depixelizer for enhancing an image generated by a spatial light modulator having an array of pixels. The depixelizer comprises a translatable stage having the spatial light modulator attached thereto. The stage is moveable in a first axis of motion and a second axis of motion. The movement of the stage in at least one axis oscillates the spatial light modulator and enhances the image generated thereby.

In the preferred embodiment, the first axis is generally perpendicular to the second axis and the stage is configured to be moveable in both the first and second axes of motion simultaneously. In order to translate the stage in both the first and second axes, the stage of the depixelizer comprises an outer stage moveable in the first axis of motion and an inner stage moveable in the second axis of motion.

In accordance with the present invention, the depixelizer further includes a first actuator attached to the outer stage and operative to translate the outer stage in the first axis of motion. Similarly, the depixelizer includes a second actuator attached to the inner stage and operative to translate the inner stage in the second axis of motion. As will be recognized, the inner stage is disposed within the outer stage by a set of inner stage mounting fingers attached to the inner stage and the outer stage. Accordingly, the second actuator is attached to the inner stage and the outer stage. Similarly, the depixelizer includes a frame that the outer stage is disposed within. The first actuator is attached to the outer stage and the frame by a set of outer stage mounting fingers.

Further, the depixelizer of the present invention includes an inner stage actuator mount spring attached to the outer stage and the second actuator and an outer stage actuator mount spring attached to the frame and the first actuator. The inner and outer stage actuator mount springs dampen vibration between the frame and the inner and outer stages. Typically, the inner stage mounting fingers, the outer stage mounting fingers, the inner stage, the outer stage, and the frame are integrally formed from a single sheet of metallic material.

In accordance with the present invention, there is provided a method of depixelizing an image generated by a spatial light modulator having a plurality of pixels with a prescribed pitch. The method comprises the step of oscillating the spatial light modulator in the direction of a first axis by a distance less than ½ the pitch of the pixels. Further, the method comprises oscillating the spatial light modulator in the direction of a second axis by a distance less than ½ the pitch of the pixels. Typically, the second axis will be generally perpendicular to the first axis. In the preferred embodiment, the spatial light modulator will be oscillated by the depixelizer in the direction of the first axis and the second axis to produce an elliptical motion of the spatial light modulator. The spatial light modulator will be oscillated in the frequency range of from about 30 Hz to 180 Hz in order to reduce the contrast ratio of the spatial light modular from 300:1 to about 2:1.

BRIEF DESCRIPTION OF THE SEVERAL VIEWS OF THE DRAWING

These as well as other features of the present invention will become more apparent upon reference to the drawings wherein.

DETAILED DESCRIPTION OF THE INVENTION

Figure 1:
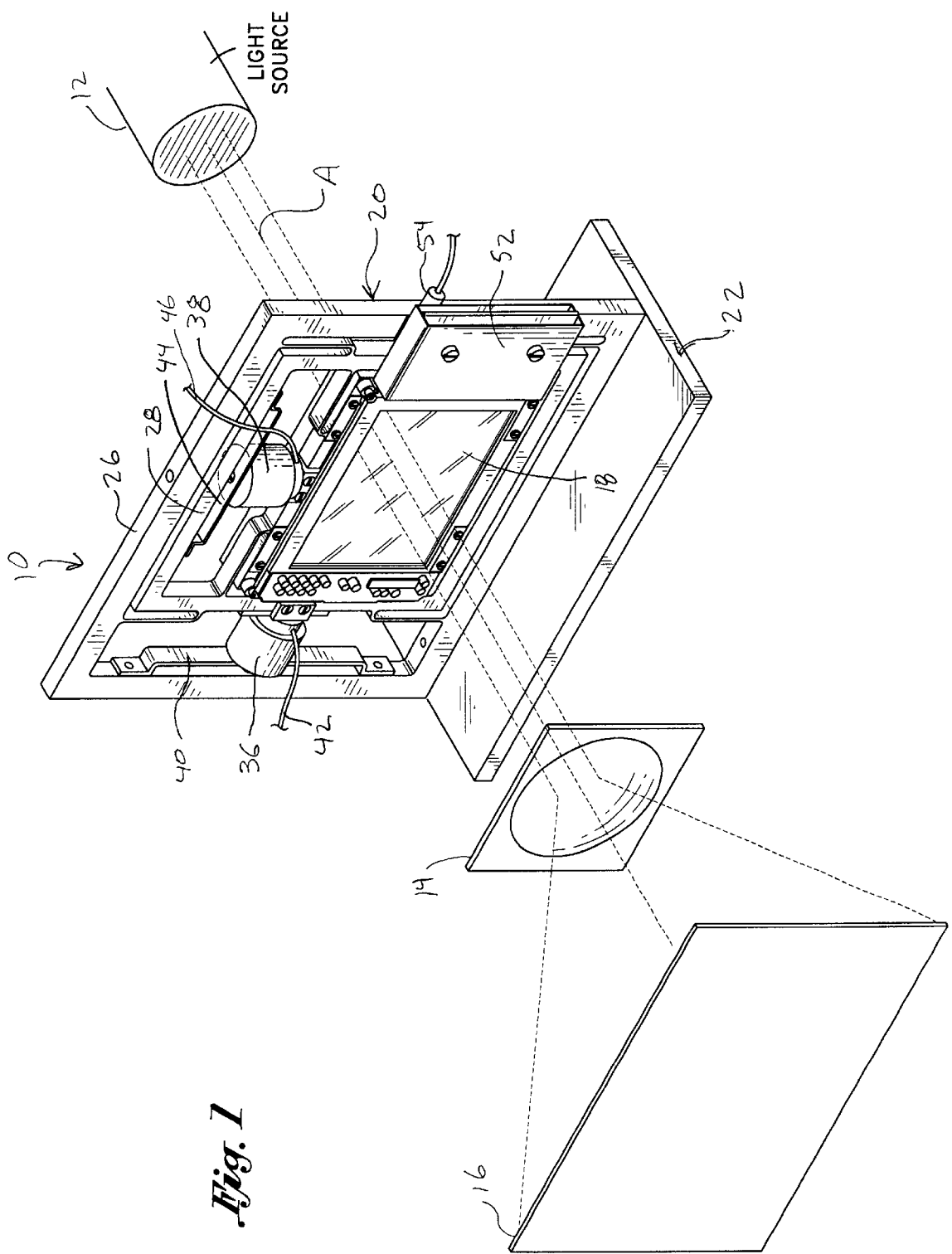
FIG. 1 is a perspective view of a depixelizer constructed in accordance with a preferred embodiment of the present invention and used in conjunction with a display system.

Referring now to the drawings wherein the showings are for purposes of illustrating a preferred embodiment of the present invention only, and not for purposes of limiting the same, FIG. 1 perspectively illustrates a depixelizer 10 used in conjunction with a light source 12, focusing lens 14 and projection screen 16. Mounted to the depixelizer 10 is a spatial light modulator (SLM) 18 such as a liquid crystal display (LCD). The SLM 18 is operative to modulate the light emitted from light source 12. In this respect, light from light source 12 travels along axis "A" through the SLM 18 and focusing lens 14. The SLM 18 modulates the light from the light source 12 into the desired effect. The focusing lens 14 directs the light from SLM 18 onto the projection screen 16 for viewing. The SLM 18 is in electrical communication with an electronic device which modulates the SLM 18 to create the desired image. The depixelizer 10 is being described as being operative with the SLM 18 for a projection system, as shown in FIG. 1. However, it will be recognized that the depixelizer 10 may be used with direct view SLM's 18 in laptop computers or other types of direct view devices (i.e., computer displays).

As previously mentioned, the SLM 18 suffers from various drawbacks because artifacts such as the screen door effect, aliasing, and Moiré patterns are created thereby. Of these artifacts, the screen door effect is amplified by the projection of the image from the SLM 18 onto the projection screen 16. As seen in FIG. 1, the focusing lens 14 enlarges the image created by the SLM 18 such that the image will be larger than the SLM 18. Accordingly, the array of black lines and columns superimposed around the pixels of the SLM 18 will be magnified and visible to a viewer.

Figure 2:
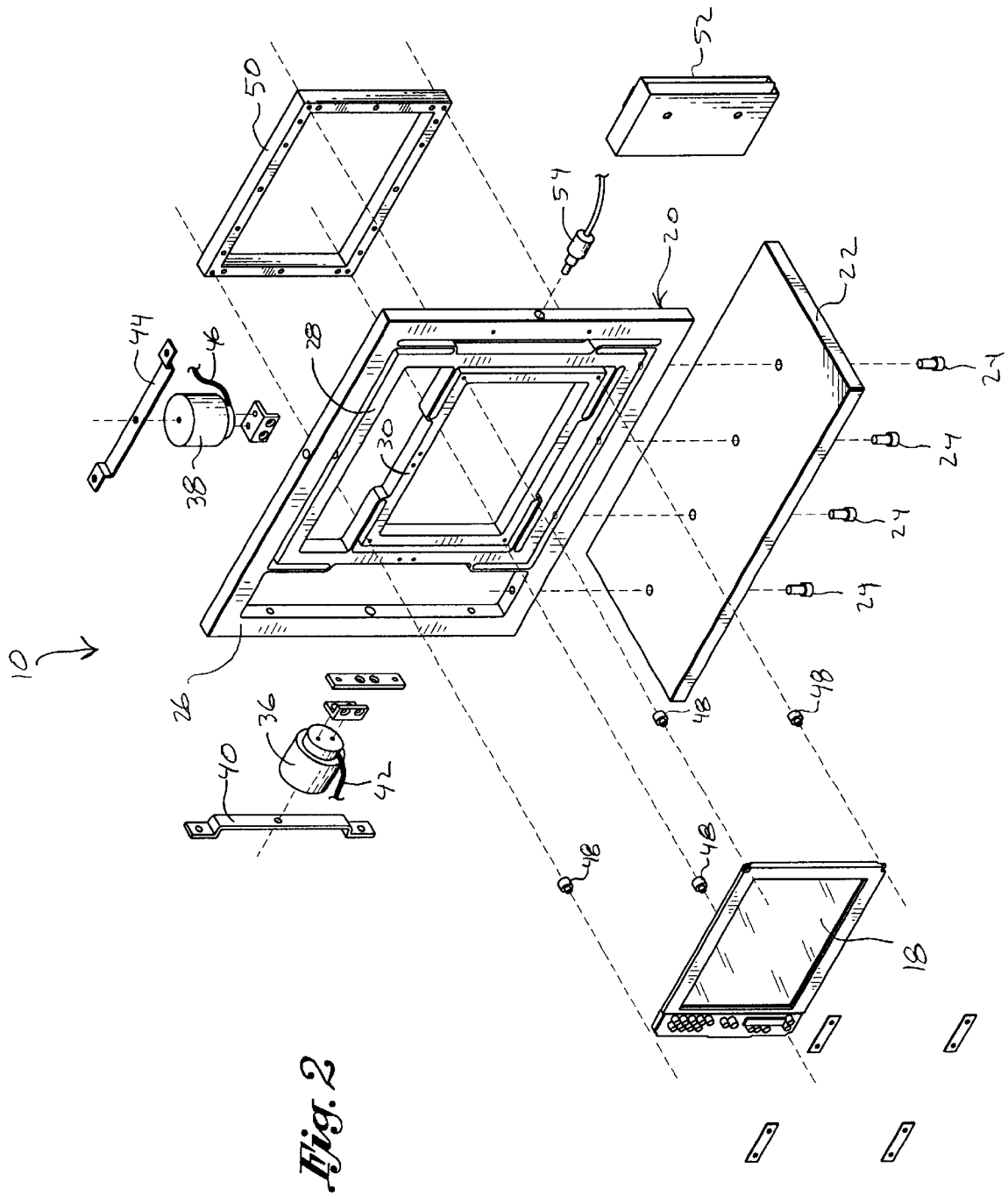
FIG. 2 is an exploded perspective view of the depixelizer shown in FIG. 1.
Figure 3:
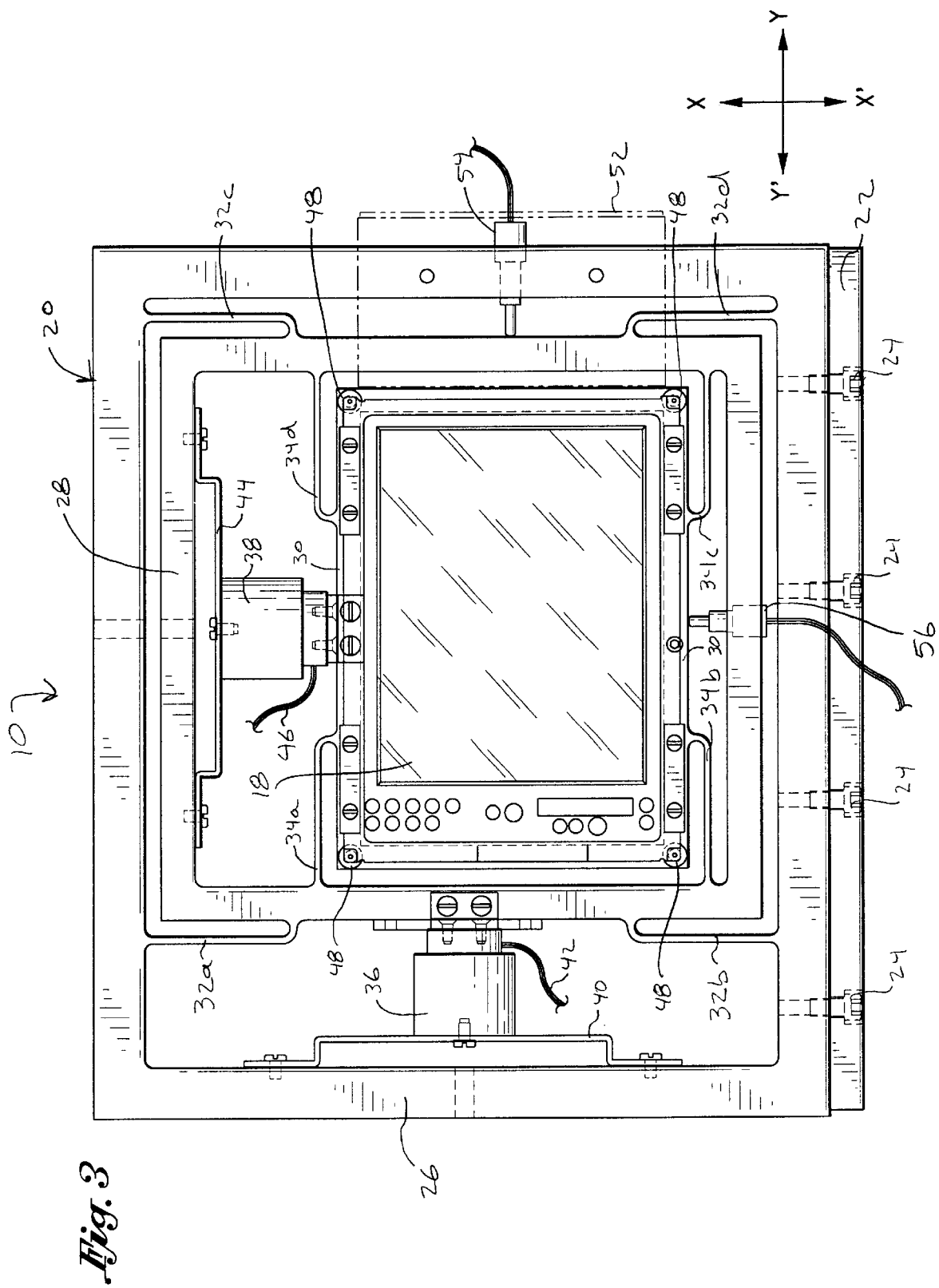
FIG. 3 is a front elevational view of the depixelizer shown in FIG. 1.

In order to reduce the screen door effect, the depixelizer 10 mechanically oscillates the SLM 18 in a prescribed direction and prescribed rate. Referring to FIGS. 2 and 3, the depixelizer 10 comprises a platform 20 for supporting the SLM 18. The platform 20 is attached to and extends perpendicularly from a base 22. The attachment of the platform 20 to the base 22 is accomplished through the use of fasteners 24. The platform 20 is milled from a single sheet of metallic material such as aluminum. The platform 20 is milled to define an outer frame 26, an outer stage 28, and an inner stage 30.

Referring to FIG. 3, the outer frame 26 is generally rectangular such that a rectangular opening is formed therein. Disposed within the opening of the outer frame 26 is the outer stage 28. As seen in FIG. 3, the outer stage 28 is generally rectangular and supported by outer stage mounting fingers 32a, 32b, 32c, and 32d. The outer stage mounting fingers 32a–32d are integrally connected to both the outer frame 26 and outer stage 28. The outer stage mounting fingers 32a–32d are milled from the platform 20 such that they are thin, flexible, and resilient. Accordingly, the outer stage mounting fingers 32a–32d provide a prescribed amount of flexure.

As seen in FIGS. 2 and 3, the outer stage mounting fingers 32a–32d are thin beams oriented along a similar direction. Specifically, each of the outer stage mounting fingers 32a–32d are generally parallel to the x-axis of the platform 20 as shown in FIG. 3. Each of the outer stage mounting fingers 32a–32d flexes in a direction perpendicularto the x-axis because each of the outer stage mounting fingers 32a–32d are oriented parallel to the x-axis. Accordingly, as will be recognized, the outer stage 28 will be translatable in the direction of the y-axis shown in FIG. 3. The outer stage 28 will therefore oscillate in the direction of the y-axis by the flexure of the outer stage mounting fingers 32a–32d, as will be explained below.

Disposed within the interior of the outer stage 28 is the inner stage 30. The inner stage 30 is supported to the outer stage 28 through inner stage mounting fingers 34a, 34b, 34c, and 34d. The inner stage mounting fingers 34a–34d are integrally connected to both the inner stage 30 and the outer stage 28. The inner stage mounting fingers 34a–34d are oriented generally parallel with the y-axis of the platform 20 and perpendicular to outer stage mounting fingers 32a–32d, as shown in FIG. 3. In this respect, each of the inner stage mounting fingers 34a–34d are generally thin, resilient and oriented parallel to they-axis. The inner stage mounting fingers 34a–34d permit the inner stage 30 to translate in the direction of the x-axis. In this respect, the inner stage 30 may oscillate in the direction of the x-axis by the flexure of the inner stage mounting fingers 34a–34d. As seen in FIG. 2, the inner stage 30 is generally rectangular with an opening formed therein. The SLM 28 is mounted within the opening of the inner stage 30. Accordingly, the oscillation of the inner stage 30 in the x-direction and the oscillation of the outer stage 28 in the y-direction will oscillate the SLM 18 attached to the inner stage 30.

In order to oscillate the outer stage 28 and inner stage 30, the depixelizer 10 includes an outer stage actuator 36 and an inner stage actuator 38. The outer stage actuator 36 is a voice coil having one end attached to the outer stage 28 and the other end attached to an outer stage actuator mount spring 40. The outer stage actuator mount spring 40 is attached to the outer frame 26. The outer stage actuator mount spring 40 is a thin, resilient/flexible beam. The outer stage actuator 36 is operative to change axial length in response to an electrical signal applied to signal line 42. An electrical signal applied to signal line 42 selectively increases or decreases the axial length of the outer stage actuator 36 such that the outer stage actuator 36 translates the outer stage 28 in the direction of the y-axis of the platform 20. The outer stage actuator mount spring 40 dampens vibration of the outer stage actuator 36 such that the outer frame 26 and platform 20 do not vibrate excessively.

The inner stage actuator 38 is attached to the inner stage 30 and an inner stage actuator mount spring 44. The inner stage actuator mount spring 44 is attached to the outer stage 28 and is resilient/flexible. In this respect, the inner stage actuator 38 is operative to translate the inner stage 30 in the direction of the x-axis. The inner stage actuator is a variable length voice coil. The axial length of the voice coil may be selectively increased or decreased by the application of an electrical signal to the signal line 46. The inner stage actuator mount spring 44 prevents vibration from the inner stage actuator 38 from reaching the outer stage 28.

The SLM 18 is attached to one side of the inner stage 30 through the use of spacers 48. As seen in FIG. 2, the spacers 48 are disposed between the SLM 18 and the inner stage 30. In this respect, a space or gap is formed between the inner stage 30 and the SLM 18. In order to balance the weight of the SLM 18, there is provided a counterweight 50 attached to a side of the inner stage 30 opposite the SLM 18. The counterweight 50 is a rectangular frame sized to balance the weight of the SLM 18.

The depixelizer 10 further includes an air nozzle 52 attached to the outer frame 26 of the platform 20. The air nozzle 52 directs a flow of air over the SLM 18. As mentioned above, the SLM 18 is spaced relative to the inner stage 30 such that a gap is formed therebetween. The air nozzle 52 is positioned to direct a flow of air over both sides of the SLM 18. The flow of air from the air nozzle 52 cools the SLM 18 during operation thereof.

As previously mentioned, the inner stage actuator 38 and the outer stage actuator 36 are operative to oscillate respective ones of the inner and outer stages 28, 30. The oscillation of the inner and outer stages 28, 30 thereby results in the oscillating movement of the SLM 18. The oscillation of the SLM 18 reduces the screen door effect. Specifically, as mentioned above, the SLM 18 comprises a plurality of pixels arranged in columns and rows. Each of the pixels is surrounded by a black border that absorbs or reflects light back to its source. Accordingly, a matrix of light spots separated by the unlit borders is created. In the preferred embodiment, the inner and outer stage actuators 36, 38 oscillate the SLM by less than ½ a pixel pitch in a basic sinusoidal pattern. A majority of the light from the light source 12 strikes the central portion of each pixel and is unaffected by the oscillating movement of the SLM 18. However, as the SLM 18 oscillates, light striking the border portion of each pixel is uncovered and is now free to be transmitted through the focusing lens 18 onto the screen 16. The oscillation of the SLM 18 causes the black borders to pass light 50% of the time. The contrast ratio between the black border and each pixel is typically greater than 300:1 without oscillation thereby creating a hard edge detectible to the eye. However, with the oscillation of the SLM 18, the contrast ratio between the black border and each pixel is reduced to less than 2:1 thereby eliminating the screen door effect.

In addition to reducing the screen door effect, the speed of oscillation of the SLM 18, by the inner and outer stage actuators 36, 38, is above a threshold detectable by the eye (i.e., between 30 Hz and 180 Hz). By setting the speed of oscillation of the SLM 18 between 30 Hz and 180 Hz, the SLM 18 will not create any Moirè patterns because the movement of the SLM 18 is not detectible by the eye. Furthermore, because the SLM 18 is oscillated in two directions (i.e., the x and y axis), a multitude of motions can be created. In the preferred embodiment, the SLM 18 is translated in an alternating elliptical motion set at plus and minus 45% in order to reduce aliasing (stair-step effect).

In order to reduce vibration of the depixelizer 10, the spring rate of the outer stage mounting fingers 32a–32d and inner stage mounting fingers 34a–34d is determined such that the product of the driven mass and spring rate will resonate at a prescribed frequency. In the preferred embodiment, the SLM 18 weighs approximately 0.5 kilograms and will be modulated at a frequency of 30 Hz. Both the inner stage actuator and outer stage actuator 36, 38 have the same mass and natural frequency as the SLM 18 and act as counter balances. The inner and outer stage actuators 36, 38 typically include a air gap disposed therein and can travel up to 50 microns in length. In the preferred embodiment, the product of the spring rate of the inner and outer stage mounting fingers 32a–d, 34a–d and the driven mass is set to resonate as the same frequency as the inner and outer stages 28, 30.

In order to detect the motion of the inner and outer stages 28, 30, the depixelizer 10 further includes an outer stage sensor 54 and an inner stage sensor 56. Both the inner and outer stage sensors 54, 56 are position sensors such as Hall or Reed effect sensors operative to detect the motion of respective inner and outer stages 28, 30. In this respect, the outer stage sensor 54 is attached to the outer frame 26 such that it can measure the relative movement of the outer stage 28. Similarly, the inner stage sensor 56 is attached to the outer stage 28 and measures the relative movement of the inner stage 30. By determining the motion of the outer stage 28 and the inner stage 30, it is possible to control the motion of the inner and outer stage actuators 36, 38 such that the SLM 18 is oscillated at a prescribed rate.

Additional modifications and improvements of the present invention may also be apparent to those of ordinary skill in the art. For example, for projectors which require three SLM's 18, it will be necessary to use three depixelizers 10 to produce the final image. In such systems, an offset voltage may be applied to each actuator of each depixelizer 10 in order to align the three different SLM's 18 without additional mechanical means of alignment. Thus, the particular combination of parts described and illustrated herein is intended to represent only a certain embodiment of the present invention, and is not intended to serve as a limitation of alternative devices within the spirit and scope of the invention.

What is claimed is:

1. A depixelizer for enhancing an image generated by a spatial light modulator having an array of pixels, comprising:
   a translatable stage having the spatial light modulator attached thereto, the stage being movable in a first axis of motion and a second axis of motion;
   wherein the movement of the stage in at least one axis oscillates the spatial light modulator and enhances the image generated thereby.

2. The depixelizer of claim 1 wherein the first axis is generally perpendicular to the second axis and the stage is configured to be movable in both the first and second axes of motion simultaneously.

3. The depixelizer of claim 2 wherein the stage comprises:
   an outer stage movable in the first axis of motion; and
   an inner stage movable in the second axis of motion.

4. The depixelizer of claim 3 further comprising:
   a first actuator attached to the outer stage and operative to translate the outer stage in the first axis of motion; and
   a second actuator attached to the inner stage and operative to translate the inner stage in the second axis of motion.

5. The depixelizer of claim 4 wherein the inner stage is disposed within the outer stage.

6. The depixelizer of claim 5 wherein the inner stage has a set of inner stage mounting fingers attached to the inner stage and the outer stage.

7. The depixelizer of claim 6 wherein the second actuator is attached to the inner stage and the outer stage.

8. The depixelizer of claim 7 further comprising a frame and the outer stage is disposed within the frame.

9. The depixelizer of claim 8 wherein the first actuator is attached to the outer stage and the frame.

10. The depixelizer of claim 9 wherein the outer stage has a set of outer stage mounting fingers attached to the outer stage and the frame.

11. The depixelizer of claim 10 wherein the inner stage and the outer stage are fabricated from a metallic material.

12. The depixelizer of claim 11 wherein the inner stage mounting fingers, the outer stage mounting fingers, the inner stage, the outer stage, and the frame are integrally formed from a single sheet of metallic material.

13. The depixelizer of 10 further comprising:

an inner stage actuator mount spring attached to the outer stage and the second actuator; and an outer stage actuator mount spring attached to the frame and the first actuator;

wherein the inner stage and outer stage actuator mount springs dampen vibration between the frame and the inner stage and outer stage.

14. The depixelizer of claim 1 wherein the spatial light modulator is a liquid crystal display (LCD).

15. A method of depixelizing an image generated by a spatial light modulator having a plurality of pixels with a prescribed pitch, the method comprising the steps:

a) oscillating the spatial light modulator in the direction of a first axis by a distance less than ½ the pitch of the pixels; and b) oscillating the spatial light modulator in the direction of a second axis by a distance less than ½ the pitch of the pixels; the second axis being generally perpendicular to the first axis.

16. The method of claim 15 wherein:

step (a) comprises oscillating the spatial light modulator in the direction of the first axis with a first actuator; and step (b) comprises oscillating the spatial light modulator in the direction of the second axis with a second actuator.

17. The method of claim 15 wherein the spatial light modulator is oscillated in the direction of the first axis and the second axis to produce an elliptical motion of the spatial light modulator.

18. The method of claim 15 wherein the spatial light modulator is oscillated by a frequency in the range of from about 30 Hz to 180 Hz.

19. The method of claim 15 wherein the spatial light modulator has a contrast ratio of 300:1 and the spatial light modulator is oscillated to reduce the contrast ratio to about 2:1.

20. A method of depixelizing an image generated by a spatial light modulator, the method comprising oscillating the spatial light modulator in at least one direction in order to enhance the image generated thereby.

21. The method of claim 20 wherein the spatial light modulator is oscillated in first direction and a second direction perpendicular to the first direction.

22. The method of claim 21 wherein the spatial light modulator is oscillated in the frequency range of from about 30 Hz to 180 Hz.

* * * * *